Nov. 29, 1938.  R. T. YOUNGMAN  2,138,753
MECHANISM FOR ACTUATING THE CONTROL SURFACES OF AIRCRAFT
Filed Dec. 1, 1936
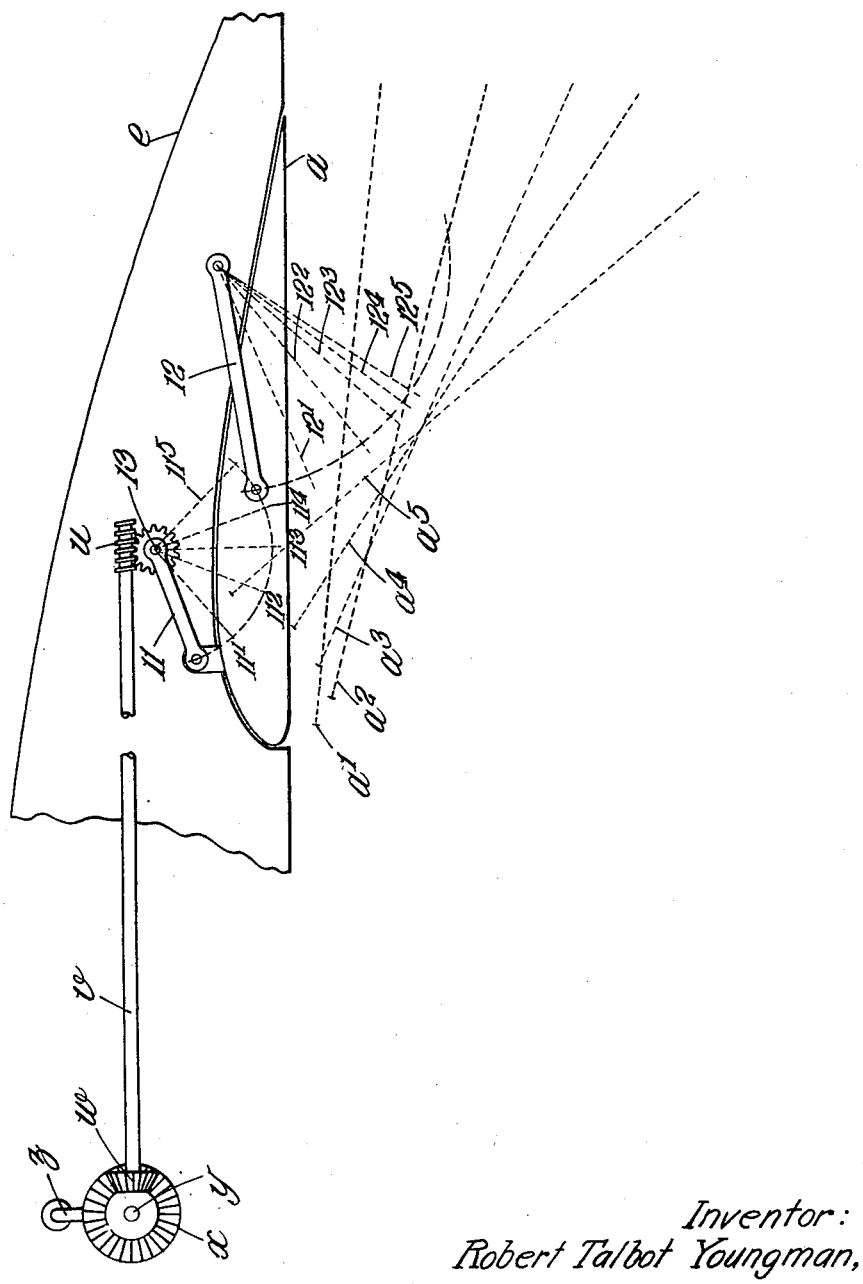
Inventor:
Robert Talbot Youngman,
Attorneys Patented Nov. 29, 1938

2,138,753

UNITED STATES PATENT OFFICE 2,138,753

MECHANISM FOR ACTUATING THE CONTROL SURFACES OF AIRCRAFT

Robert Talbot Youngman, Aldershot, England

Application December 1, 1936, Serial No. 113,658
In Great Britain December 13, 1935

1 Claim. (Cl. 244—42)

Various mechanisms have been proposed for actuating the control surfaces of aircraft, in particular, the so-called "flaps" of large aircraft, the operation of which presents difficulties on account of the hinge movements and other complications involved, whether the mechanism be power (e. g. hydraulic, electric) or hand operated, further it has been found that there is a considerable and undesirable time lag in the functioning of such mechanisms.

It has been proposed to mount a flap on an aircraft wing so that it may be lowered bodily from its normal retracted position to a position below the wing level and turned to a desired extent about a transverse axis at or near the centre of pressure, the bodily lowering and turning movements of the flap being effected independently and either successively or simultaneously. It has also been proposed to provide mechanism whereby the bodily lowering and turning movements of the flap must be effected concurrently. In accordance with the present invention, however, the mechanism whereby the bodily lowering and turning movements of the flap must be effected concurrently, is so arranged that the leading edge of the flap is lowered at the commencement of the movement to permit the flow of air to pass over the upper surface of the flap, thereby increasing the lift while it is rotated to the desired position about an axis passing through or near its center of pressure, thus reducing the operating force to be applied thereto. The accompanying drawing discloses a fragmentary diagrammatic cross-section on a fore and aft plane of the wing of an aircraft, illustrating one form of the invention.

As shown in the drawing, flap $a$ is carried by a pair of links $11$ and $12$ pivotally connected therewith at their lower ends and with the aircraft wing $e$ at their upper ends. The links $11$ and $12$ are of unequal length, the link $12$ being in rear of, and longer than, the link $11$. The upper end of the link $11$ is fast on a shaft $13$ rotatably mounted on the aircraft wing $e$ and also fast on said shaft is a worm wheel $14$ with which meshes a worm $u$ on a worm shaft $v$ at the other end of which latter is a bevel wheel $w$ meshing with a bevel wheel $x$ on a shaft $y$ which carries a crank handle $z$. As shown, the pivotal connection—of the link $11$ with the flap $a$ is close to, but outside, the profile of said flap, whilst the corresponding pivotal connection of the link $12$ is within said profile. The lengths of the links $11$ and $12$ and the situations of their pivotal axes are such that when the crank handle $z$ is turned, the flap $a$ is lowered bodily—and concurrently turned about a virtual pivotal axis as indicated in dotted lines where $11^1$, $11^2$, $11^3$, $11^4$ and $11^5$, $12^1$, $12^2$, $12^3$, $12^4$, $12^5$ and $a^1$, $a^2$, $a^3$, $a^4$ and $a^5$ represent corresponding successive positions of the links $11$ and $12$ and of the flap $a$ respectively.

Although only one link $11$ and one link $12$ has been mentioned above, it is to be understood that such links may be arranged in pairs $11$, $11$ and $12$, $12$ and a single mechanism may suffice to actuate a pair of links $11$, e. g., both said links may be fast on the shaft $13$ on which the worm wheel $14$ is mounted.

Alternatively, in the case, for instance, of a long flap, there may be three or more links such as $11$ and three or more links such as $12$ suitably positioned along the flap.

If desired, the link $12$ may be driven instead of the link $11$, whilst the worm driven gear may be replaced by crank levers and push and pull rods or sprocket wheels and chains or the like, or hydraulic or other power means may be employed for effecting the actuation of the links $11$ and $12$.

I claim:

In a mechanism for the control of aircraft including a wing, a movable flap, mounted on the under surface of said wing adjacent to the trailing edge, means for moving said flap, and a second means for guiding said flap in its movement from a retracted position wherein it lies adjacent and substantially parallel to said wing, to partially and fully extended positions, said second means comprising downwardly and forwardly extending front and rear links pivotally mounted at their upper ends to said wing and at their lower ends to said flap, the front link being substantially shorter than the rear link, the relationship between the links and their points of pivotation being such that the initial pivoting of said links swings said flap more downwardly than rearwardly from said wing to a partially extended position below and substantially parallel to said wing whereby to form a slot between said flap and said wing, and further pivoting of said links swings said flap to a fully extended position wherein the front end of said flap lies relatively close to said wing and the rear end lies substantially below the wing whereby substantially to close said slot and position the flap at a substantial angle to said wing.

ROBERT TALBOT YOUNGMAN.